US006625363B2

(12) United States Patent
Carter et al.

(10) Patent No.: US 6,625,363 B2
(45) Date of Patent: Sep. 23, 2003

(54) CLADDING-PUMPED OPTICAL FIBER

(75) Inventors: Adrian Carter, Bulli (AU); Kanishka Tankala, South Windsor, CT (US); Nils J. Jacobson, North Granby, CT (US)

(73) Assignee: Nufern, East Granby, CT (US)

( * ) Notice: Subject to any disclaimer, the term of this patent is extended or adjusted under 35 U.S.C. 154(b) by 0 days.

(21) Appl. No.: 09/875,751

(22) Filed: Jun. 6, 2001

(65) Prior Publication Data
US 2002/0191928 A1 Dec. 19, 2002

(51) Int. Cl.[7] .............................. G02B 6/22; H04B 10/12
(52) U.S. Cl. ........................ 385/127; 385/126; 385/144; 359/341.1
(58) Field of Search ......................... 385/146, 126–128, 385/32, 115, 144, 141, 123–124; 359/341.3, 134, 341.1; 372/6

(56) References Cited

U.S. PATENT DOCUMENTS

| 3,729,690 A | | 4/1973 | Snitzer | |
| 3,808,549 A | | 4/1974 | Maurer | |
| 4,173,393 A | * | 11/1979 | Maurer | 385/128 |
| 4,315,666 A | * | 2/1982 | Hicks, Jr. | 385/125 |
| 4,546,476 A | | 10/1985 | Shaw et al. | |
| 4,701,614 A | * | 10/1987 | Jaeger et al. | 385/126 |
| 4,709,986 A | | 12/1987 | Hicks, Jr. | |
| 4,815,079 A | | 3/1989 | Snitzer et al. | |
| 5,121,460 A | | 6/1992 | Tumminelli et al. | |
| 5,319,652 A | | 6/1994 | Moeller et al. | |
| 5,349,590 A | | 9/1994 | Amirkhanian et al. | |
| 5,371,815 A | * | 12/1994 | Poole | 385/123 |
| 5,402,966 A | * | 4/1995 | von Hoessle | 385/123 |
| 5,418,880 A | | 5/1995 | Lewis et al. | |
| RE35,020 E | * | 8/1995 | Quinlan, Jr. | 385/13 |
| 5,533,163 A | | 7/1996 | Muendel | |
| 5,756,209 A | | 5/1998 | Hale | |
| 5,761,234 A | | 6/1998 | Craig et al. | |
| 5,822,489 A | | 10/1998 | Hale | |
| 5,864,645 A | | 1/1999 | Zellmer et al. | |
| 5,873,923 A | | 2/1999 | DiGiovanni | |
| 5,898,715 A | | 4/1999 | LeGrange et al. | |
| 5,949,941 A | | 9/1999 | DiGiovanni | |
| 5,966,491 A | | 10/1999 | DiGiovanni | |
| 6,031,850 A | | 2/2000 | Cheo | |
| 6,101,199 A | | 8/2000 | Wang et al. | |
| 6,115,526 A | | 9/2000 | Morse | |
| 6,157,763 A | | 12/2000 | Grubb et al. | |

FOREIGN PATENT DOCUMENTS

| EP | 1043816 A2 | * 10/2000 | ............ C03C/13/04 |
| EP | 1 043 816 A2 | 11/2000 | |
| WO | WO 93/15536 | 8/1993 | |
| WO | WO 99/30391 | 6/1999 | |

OTHER PUBLICATIONS

U.S. patent application No. 09/694,549, assigned to Tankala et al., filed Oct. 23, 2000.
U.S. patent application to Carter et al., Ser. No. to be assigned, filed Jun. 25, 2001.

* cited by examiner

Primary Examiner—Robert H. Kim
Assistant Examiner—Krystyna Suchecki
(74) Attorney, Agent, or Firm—Peter J Rainville

(57) ABSTRACT

Optical apparatus including a cladding-pumped optical fiber that includes a core that includes an active material, a multimode inner cladding disposed about the core, and a second cladding disposed about the multimode inner cladding. The cladding-pumped optical fiber can include, disposed about the inner cladding layer, an asymmetrical layer, a layer that includes granular matter, a compressive layer, or a hard layer. External provision can be included for applying stress to the cladding-pumped optical fiber.

25 Claims, 8 Drawing Sheets ndo # CLADDING-PUMPED OPTICAL FIBER

FIELD OF THE INVENTION

This invention relates to optical fibers and, more particularly, to an optical fiber having an inner cladding for receiving pump radiation that is to be absorbed by active material in the core of the optical fiber.

BACKGROUND

Optical fiber lasers and amplifiers are known in the art. In such lasers and amplifiers, rare earth materials disposed in the core of the optical fiber laser or amplifier absorb pump radiation of a predetermined wavelength and, responsive thereto, provide or amplify light of a different wavelength for propagation in the core. For example, the well-known erbium doped fiber amplifier (EDFA) receives pump radiation having a wavelength of 980 or 1480 nanometers (nm) and amplifies an optical signal having a wavelength in the 1550 nm region and propagating in the core.

In such optical fiber lasers and amplifiers, the pump radiation can be introduced directly to the core, which can be difficult due to the small size of the core, or can be introduced to the cladding layer surrounding the core and absorbed by the core as the rays propagating in the cladding layer intersect the core. Lasers and amplifiers wherein the pump radiation is to be introduced to the cladding layer are known as "cladding-pumped" optical devices, and facilitate the scale-up of lasers and amplifiers to higher power systems.

FIG. 1 illustrates an optical fiber having a core 20, an inner, or pump, multimode cladding layer 22, and an outer cladding layer 24. The inner cladding layer 22 confines light rays 26, which represent the light generated or amplified in the core 20, to the core 20. Similarly, the outer cladding 24 confines light rays 28, which represent pump radiation propagating in the inner cladding 22, to the inner cladding 22. Note that the rays 28 periodically intersect the core 20 for generating or amplifying the light in the core 20, represented by the rays 26. Because the inner cladding 22 is multimode, many rays other than those shown by reference numeral 28 can propagate in the inner cladding 22.

Absorption per unit length is a useful figure of merit for evaluating a cladding-pumped optical fiber laser or amplifier. It is typically desirable that the amplifier or laser has a high absorption per unit length, indicating that the pump radiation frequently intersects the core 20. It has been determined by various researchers over the years that a standard circular fiber geometry, such as is desirable when fabricating an optical fiber for transmission over substantial distances, does not optimally promote absorption by the core 20 of the radiation pumped into the cladding layer 24. Unfortunately, some rays (referred to in the art as skew rays) of the pump radiation 28 can essentially propagate down the optical fiber while spiraling around the core without substantially intersecting the core 20. See FIG. 1B, where pump radiation rays 28A do not intersect the core 20. This leads to a low absorption per unit length of the optical fiber device, and hence detracts from the performance of the optical fiber laser or amplifier.

The prior art teaches two approaches for enhancing the intersection of the pump radiation with the core and hence raising the absorption per unit length of the optical fiber amplifier or laser. In the first approach, the core is relocated to intersect more of the rays of the pump radiation. For example, as shown in FIG. 2A and disclosed in U.S. Pat. No. 4,815,079, issued Mar. 21, 1989 to Snitzer et al., the core can be offset from the center of the optical fiber so as to enhance the intersection of pump light with the core.

In the second approach, the shape of the outer circumference of the inner, or pump, cladding layer is modified to scatter more rays towards the core so as to intersect with the core. For example, as shown in FIG. 2B and also disclosed in the '079 patent to Snitzer, the inner cladding can have a rectangular outer circumference. See also FIG. 2C, where the inner cladding has a "D"-shaped outer circumference that includes a flat section, as disclosed in U.S. Pat. No. 5,864,645, issued Jan. 26, 1999 to Zellmer et al. In yet another example of this approach, the outer circumference of the cladding is shaped as a polygon, such as a hexagon, as disclosed in U.S. Pat. No. 5,533,163, issued Jul. 2, 1996 to Muendel and shown in FIG. 2D. In yet further examples, the outer circumference of the inner cladding has a "star" shape, as disclosed in U.S. Pat. No. 5,949,941, issued Sep. 7, 1999 to DiGiovanni and illustrated in FIG. 2E. See also WO 99/30391, published Jun. 17, 1999, disclosing an optical fiber having a core, inner and outer claddings, and a series of circularly shaped perturbations or irregularities formed in the otherwise circular outer boundary of the inner cladding, as shown in FIG. 2F. The optical fiber is drawn from a preform having rods inserted into holes drilled into the preform.

The prior art approaches discussed above can have disadvantages. For example, the resultant fibers can be difficult to splice to a fiber having a standard, circular geometry in a manner that provides for an acceptably low loss of light, as is often required in a practical application. The offset core fiber of FIG. 2A can be particularly difficult to splice. Furthermore, designs shown in FIGS. 2B–2F, wherein the outer circumference of the inner cladding is shaped, can require shaping of the preform from which the fiber is drawn. Shapes that include flat areas, such as the polygon design discussed above, can be difficult and/or time consuming, and hence more expensive, to fabricate. The flat areas are typically first machined into the preform from which the optical fiber is drawn. In addition, shaped areas of the preform tend to deform and change shape when the fiber is drawn at the most desirable temperatures. Accordingly, often the draw temperature is reduced to preserve the desired shape of the outer circumference of the cladding. A reduced draw temperature typically produces optical fibers having higher attenuation and lower mechanical strength.

Accordingly, although the approaches described above may represent an improvement in the art, a cladding-pumped fiber that addresses one or more of the foregoing disadvantages and drawbacks of the prior art approaches would be a welcome advance in the art.

SUMMARY OF THE INVENTION

In one aspect, the present invention provides an optical apparatus that includes a cladding-pumped optical fiber. The cladding-pumped optical fiber includes the following: a core including a material having a first index of refraction and an active material; a multimode inner cladding layer for receiving pump radiation, where the inner cladding layer is disposed about the core and includes material having a second index of refraction that is less than the first index of refraction; a second cladding layer disposed about the inner cladding layer, where the second cladding layer includes material having a third index of refraction that is less than the second index of refraction; and a layer disposed about the inner cladding layer, where the layer includes granular matter for applying stress to the fiber for enhancing the absorption of pump radiation by the core. The second cladding layer can include granular matter. The cladding-pumped optical fiber can include a third layer disposed about the second cladding layer, where the third layer includes granular matter. The cladding-pumped optical fiber can include at least one bend.

In another aspect, the present invention provides an optical apparatus comprising a cladding-pumped optical fiber. The cladding-pumped optical fiber includes the following: a core including a material having a first index of refraction and an active material; a multimode inner cladding layer for receiving pump radiation, where the inner cladding layer is disposed about the core and includes material having a second index of refraction that is less than the first index of refraction; a second cladding layer disposed about the inner cladding layer, where the second cladding layer includes material having a third index of refraction that is less than the second index of refraction; and a layer disposed asymmetrically about the inner cladding layer for applying stress to the fiber for enhancing the absorption of pump radiation by the core. The asymmetrically disposed layer can include a hard polymer. The second cladding layer can be disposed asymmetrically about the inner cladding. The cladding-pumped optical fiber can include at least one bend.

In yet a further aspect, the present invention provides an optical apparatus comprising a cladding-pumped optical fiber. The cladding-pumped optical fiber includes the following: a core including a material having a first index of refraction and an active material; a multimode inner cladding layer for receiving pump radiation, where the inner cladding layer is disposed about the core and includes material having a second index of refraction that is less than the first index of refraction; a second cladding layer disposed about the inner cladding layer, where the second cladding layer includes material having a third index of refraction that is less than the second index of refraction; and a compressive layer that contracts after being applied to the fiber and that is disposed about the first cladding layer for applying stress to the fiber. The compressive layer can be disposed asymmetrically about the inner cladding and/or can be disposed about both the first and second cladding layers. The cladding-pumped optical fiber can include at least one bend.

In each of the foregoing practices of the invention, the optical apparatus can include an external means for applying stress to the cladding-pumped optical fiber. The external means can include a mechanical structure about which the cladding-pumped optical fiber is bent.

Thus while the prior art typically teaches away from certain features of the invention as claimed above, such as the inclusion of granular matter, normally considered a contaminant, in a layer of an optical fiber and the application of stress to the fiber, it is understood, according to the invention, that including such features can provide an improved optical apparatus including a cladding-pumped optical fiber.

BRIEF DESCRIPTION OF THE DRAWINGS

The present invention may be more clearly understood from a consideration of the following Detailed Description and the accompanying drawings, in which.

DETAILED DESCRIPTION OF THE PREFERRED EMBODIMENTS

Figure 1A:
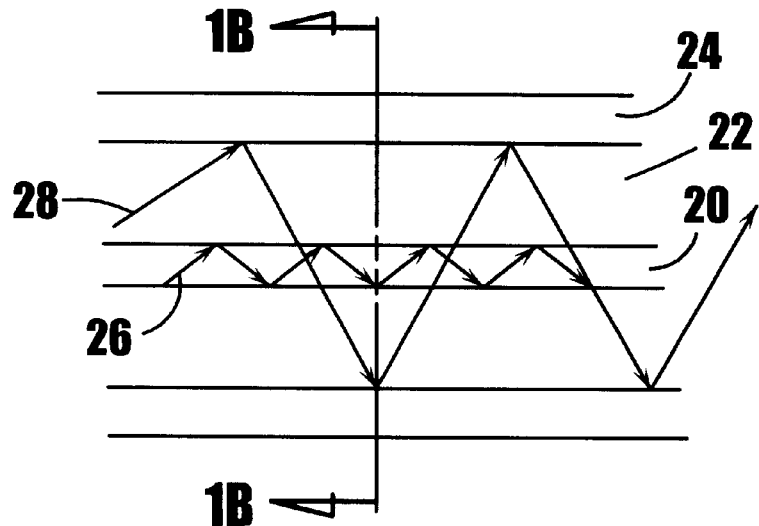
FIG. 1A shows a cross section of a cladding-pumped optical fiber, showing the intersection of pump radiation propagating in the inner cladding layer of the fiber with the core of the fiber.
Figure 1B:
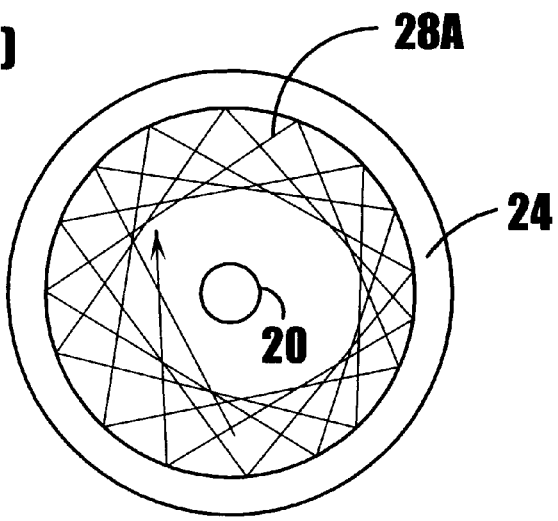
FIG. 1B shows a cross section taken along section line 1B—1B of FIG. 1A and illustrates pump radiation propagating in the inner cladding of the optical fiber and spiraling without intersecting the core of the fiber.
Figure 2A:
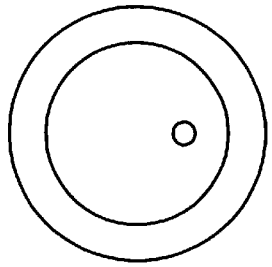
FIG. 2A shows a cross section of a prior art optical fiber having an offset core.
Figure 2B:
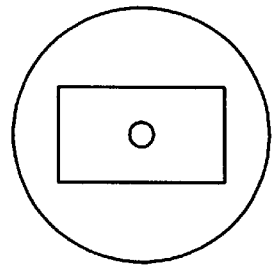
FIG. 2B shows a cross section of a prior art optical fiber having a rectangular inner cladding.
Figure 2C:
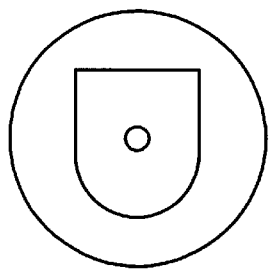
FIG. 2C shows a cross section of a prior art optical fiber having a "D" shaped inner cladding.
Figure 2D:
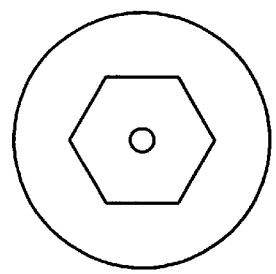
FIG. 2D shows a cross section of a prior art optical fiber having an hexagonal inner cladding.
Figure 2E:
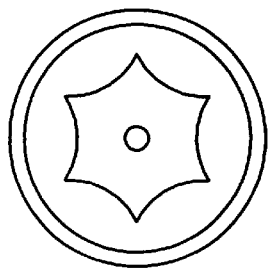
FIG. 2E shows a cross section of a prior art optical fiber having a "star" shaped inner cladding.
Figure 2F:
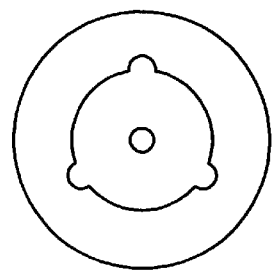
FIG. 2F shows a cross section of a prior art optical fiber having an inner cladding including circularly shaped irregularities.
Figure 3:
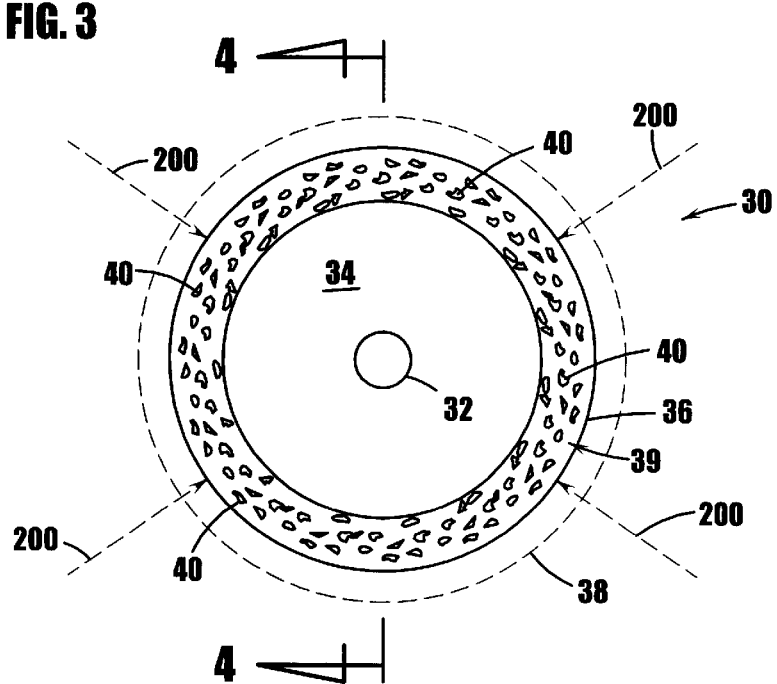
FIG. 3 shows a cross section of one embodiment of an optical fiber according to the present invention.

FIG. 3 shows a cross section of one embodiment of a cladding-pumped optical fiber according to the present invention. The optical fiber 30 includes a core 32, a multimode cladding layer 34 disposed about the core 32, and a second cladding layer 36 disposed about the multimode cladding layer 34. The term "disposed about", as used herein, refers to one layer surrounding, at least partially, another layer, and does not require that the layers be adjacent. The multimode cladding layer 34 includes material having a lower index of refraction than the index of refraction of material included in the core 32, such that the laser light to be amplified or generated in the core 32 is confined largely to the core 32 by the phenomenon of total internal reflection. Similarly, the second cladding layer 36 includes material having a lower index of refraction than material included in the multimode cladding layer 34 such that the pump radiation is confined largely to the multimode cladding layer 34. The cladding-pumped optical fiber 30 can also include an additional layer or layers, as indicated by reference numeral 38. For example, the layer(s) 38 can include a polymer (e.g., acrylate) protective layer disposed about the second cladding layer 36. The second cladding layer 36 can be a glass or a polymer, or other material having a suitable index or refraction (i.e., lower than an index of refraction of the multimode cladding layer 34) and appropriate mechanical properties. If the second cladding layer 36 includes a polymer, use of a protective layer disposed about the second cladding layer 36 may not be necessary.

The core 32 typically includes active material, such as one or more rare-earth dopants, which can be selected from the Lanthanide group of elements in the periodic table, in a glass matrix, which can be a silica glass matrix. Other materials, such as, for example, Ge, P, Al, B, F, etc. can also be included as dopants, in the core 32 or in one or more of the other layers 34, 36 and 38. As is known in the art, such dopants can be added for a variety of reasons, such as, for example, to modify the refractive index of the core 32, to improve the performance of the rare earth dopants in the core 32, to render the core 32 or the cladding layer(s) sufficiently photosensitive, or to improve the radiation hardness of the core 32. As noted above, when the pump radiation intersects the core 32, the pump radiation can be absorbed by the rare earth materials, such as erbium, in the core 32 for amplifying or generating the laser light propagating in the core 32.

The second cladding layer 36 can include granular matter 39 that includes individual particles or granules 40. As those or ordinary skill in the art are aware, in many other circumstances granules may be considered a contaminant, and careful measures are often taken to avoid including any granular matter in a cladding-pumped optical fiber or in any other type fiber. However, according to the present invention, granular matter 39 is deliberately included in one or more of the cladding or other layers of the optical fiber 30. The granular matter 39 is considered to induce micro bending and hence stress in the fiber for mixing modes of the pump radiation so as to increase intersection of pump radiation rays with the core 32, enhancing the absorption of the pump radiation by the active material in the core of the cladding-pumped optical fiber 30.

Figure 4:
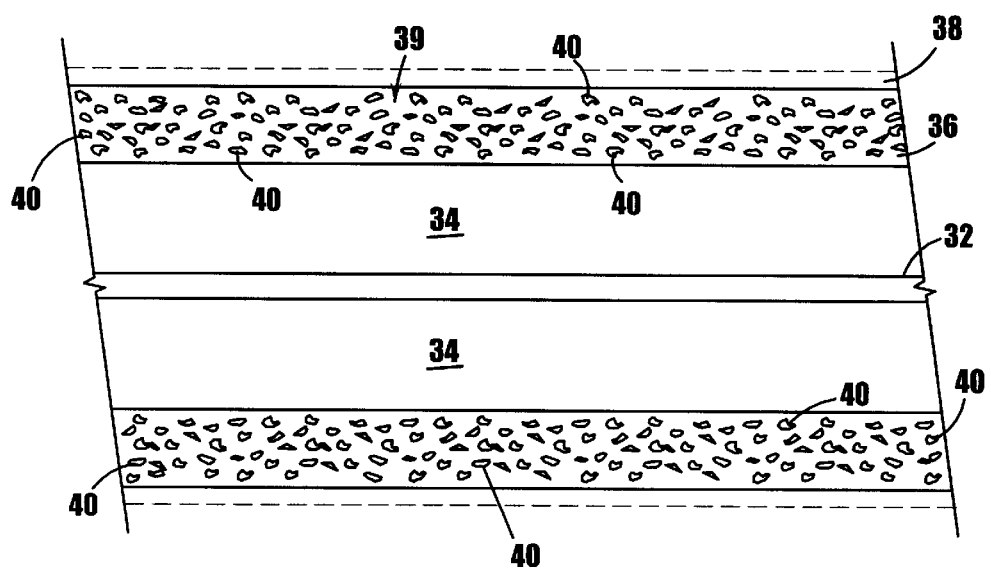
FIG. 4 shows a cross section of the optical fiber shown in FIG. 3, taken a long section line 4—4 of FIG. 3.
Figure 5:
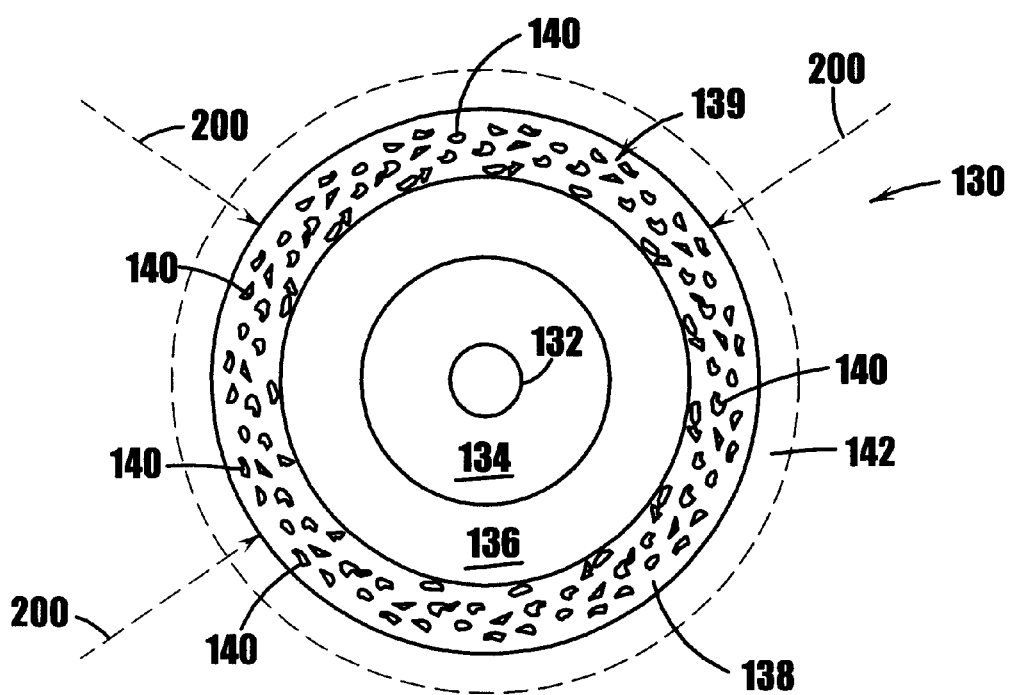
FIG. 5 shows a cross section of another embodiment of an optical fiber according to the present invention.

FIG. 4 is a cross section, taken along section line 4—4 of FIG. 3, of the optical fiber 30 shown in FIG. 3. As is shown in both FIGS. 3 and 4, the granular matter is preferably included in a layer adjacent the pump cladding layer 34, such as in the second cladding layer 36. However, the granular matter 39 need not be so located. For example, as shown in FIG. 5, the granular matter 139 can be included in the layer 138 of the optical fiber 130 shown in FIG. 5.

The density of the granular matter 39 can be specified in terms of the number of particles or granules per unit volume of the material of the layer in which the granular matter 39 is distributed. The granular matter 39 can also be specified by the weight of the granular matter per unit volume, or per unit weight, of the material of the layer in which the granular matter is distributed. Preferably, the granular matter 39 is uniformly distributed.

Figure 6:
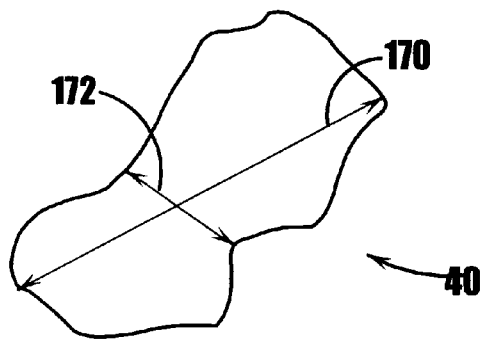
FIG. 6 illustrates one example of a granule of granular material to be included in a layer of an optical fiber.

FIG. 6 illustrates a granule or particle 40. The particle 40 need not be spherical, and can be irregularly shaped, having a maximum diameter 170 and a minimum diameter 172. Preferably, the minimum diameter 172 of the particle 40 is from 0.1 micron to 500 microns; more preferably the minimum diameter 172 is from 1 micron to 200 microns; and most preferably the minimum diameter 172 is from 2 microns to 100 microns.

The aspect ratio of the particle 40 can be defined as the ratio of the minimum diameter 172 to the maximum diameter 170. Preferably, the aspect ratio of the particles is from 1:1 to 1:200; more preferably, the aspect ratio is from 1:1 to 1:100; and most preferably, the aspect ratio is from 1:1 to 1:10.

The term "granular matter", as used herein, can include, but is not limited to, sand, ceramics, such as silica, alumina, silicon carbide, metals, or non-metallic materials, such as, for example, plastics.

Figure 7:
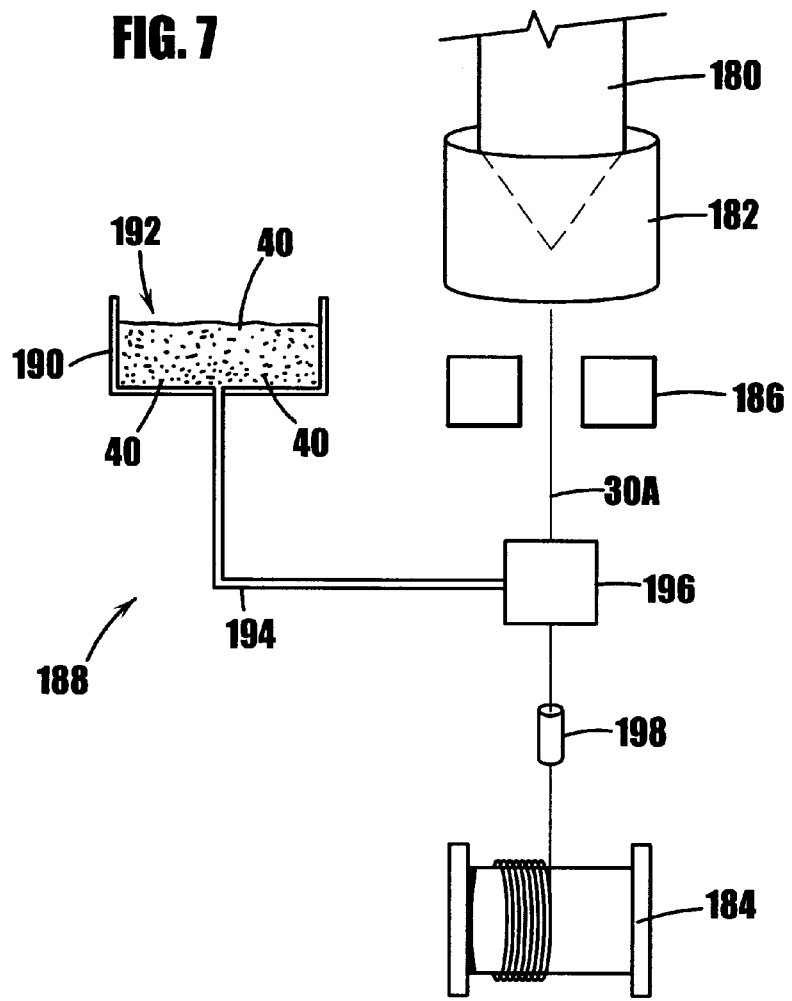
FIG. 7 illustrates one technique for including the granular material in a layer of an optical fiber.
Figure 8A:
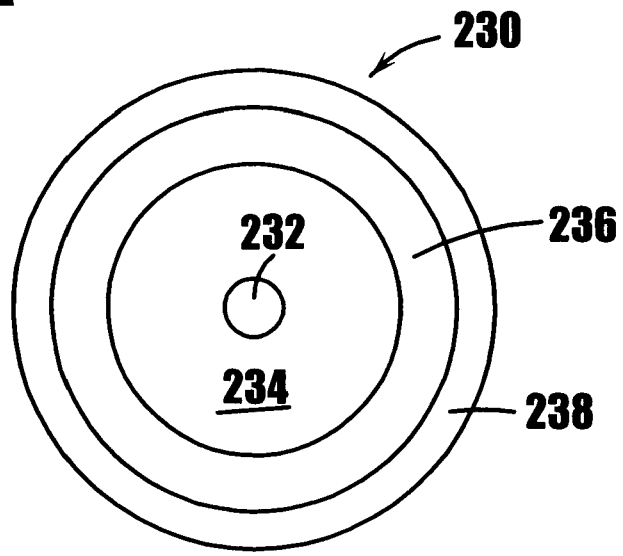
FIG. 8A shows a cross section of another embodiment of an optical fiber according to the invention.
Figure 8B:
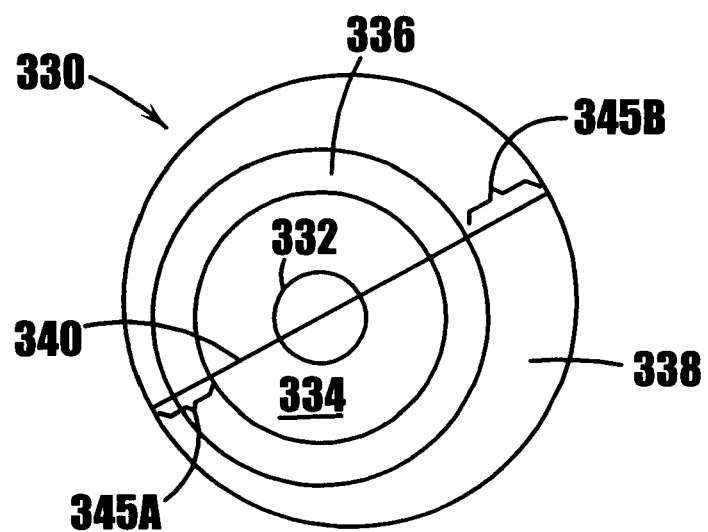
FIG. 8B shows a cross section of yet a further embodiment of an optical fiber according to the present invention.

FIG. 7 schematically illustrates drawing the optical fiber 30A from a preform 180, as well as delivering the granular matter to layer of the optical fiber 30A. The preform 180 can be made by conventional methods known to those of ordinary skill in the art of making preforms, including vapor phase axial deposition (VAD), outside vapor deposition (OVD), or modified chemical vapor deposition (MCVD), as well as other methods.

A furnace 182, such as a high frequency induction furnace or a resistance furnace, heats the preform 180. A spool 184 pulls the optical fiber 30A from the preform 180 as the furnace 182 heats the preform 180. A diameter-measuring element 186 can be included for monitoring the diameter of the drawn optical fiber 30A.

Coating apparatus 188 includes a reservoir 190 that contains coating solution 192 that includes granular matter 39 that includes granules 40. Plumbing 194 delivers the coating solution 192 to the die 198 for coating the fiber 30A.

Apparatus 198, which can be an ultraviolet (uv) lamp, can also be included for curing the coating material before the optical fiber 30 is wound on the spool 184. The arrangement of apparatus shown in FIG. 3A is exemplary, and the term "drawing", as used herein, refers to heating glass and forming a strand of fiber from the glass.

Other techniques are also possible for providing granular matter to an optical fiber. For example, the granular matter can also be included in the preform 180. In one practice of the invention, the preform 180 can include a glass tube that includes the granular matter and which is added to the preform in an "oversleeving" operation prior to the drawing of the fiber.

According to the teachings of the prior art, the protective layer 38 typically would include a first, soft layer nearer the second cladding layer 36 and a second, hard layer over the first layer. The soft layer helps reduce microbending losses in the fiber by yielding so as to reduce the stress on the core and/or the cladding layers of the fiber, and the hard layer acts to protect the fiber by resisting abrasion and the like. However, according to the present invention, the hard layer can be disposed immediately adjacent a cladding layer for increasing the stress on the inner cladding of the fiber for increasing the absorption of the pump radiation by the core. In one practice of the invention, the second cladding layer includes a hard polymer and is disposed immediately adjacent the inner cladding layer; in another practice of the invention, a hard layer is disposed about and immediately adjacent the second cladding layer. Such hard layers are typically polymers.

The terms "hard" and "soft" are defined in the art in different ways, such as by the modulus of the layer, by the HDD hardness of the layer, or by the glass transition temperature of the layer. In terms of modulus, a soft layer typically has a modulus of 20 Mpa or less, while a hard layer has a modulus of 50 Mpa or more. More preferably, a hard layer has a modulus of 500 Mpa or more, and most preferably, a modulus of 1000 Mpa or more.

HDD Hardness refers to the Hardness Durometer D grade hardness measured in accordance with the American Society For Testing and Materials, Standard D2240 (usually abbreviated "ASTM D2240"). All hardness values quoted herein are measured at 23° C.

In terms of HDD hardness, a soft layer typically has an HDD hardness of 40 or less, while a hard layer has an HDD hardness of 50 or more. More preferably, a hard layer has an HDD hardness of 60 or more, and most preferably, a hard layer has an HDD hardness of 70 or more.

The midpoint of the glass transition temperature of a hard layer is typically higher than room temperature. Soft layers, conversely, have midpoints below room temperature, and typically lower than −40° C.

The foregoing terms are included to provide some quantitative definition to the terms "soft" and "hard", in accordance with the definitions of those terms often employed by those of ordinary skill in the art. It is not required that the foregoing terms be used in the conjunctive, such that a hard (or soft) coating must meet that definition simultaneously under all three criteria.

In another practice of the invention, a layer can be included for applying a compressive stress to the fiber. Such a "compressive stress" layer is known from U.S. Pat. No. 4,173,393, herein incorporated by reference to the extent necessary to understand the present invention, and can include, for example, a metallic glass that is applied as a liquid and contracts when solidified FIG. 5A illustrates a fiber 320 including a core 232, a first cladding 234, and second cladding 236, and a layer 238 that includes a material for applying a compressive stress to the fiber. A "compressive stress" layer can be included in an optical fiber as the layer 38 of FIG. 3 or the layer 142 of FIG. 5. Alternatively or additionally, the granular matter 39 can be included in such a "compressive stress" layer. Solidification of the layer is understood to compress the optical fiber in at least the radial direction. Reference numeral 200 of FIGS. 3 and 5 illustrates the imposition of radial compressive stress on the optical fibers 30 and 130, respectively.

A cladding-pumped fiber according to the invention can include a layer, disposed about the inner cladding layer, which is asymmetrically disposed about the inner cladding layer. Such an asymmetric layer is considered to increase the stress applied to the inner cladding, particularly when external means, described below, are employed to increase the stress applied to the fiber. As described elsewhere herein, applying stress is considered to promote mode mixing in the inner cladding and hence increased intersection between rays of the pump radiation and the core, and therefore to a higher absorption of the pump radiation by the active material in the core per unit length of the fiber. The optical fiber 330 shown in FIG. 5B includes a core 332, the inner cladding 334, the outer cladding 336, and the asymmetrically disposed layer 338, which can be a hard layer as defined above. Note that for a given diameter 340 of the layer 338, which diameter passes through the geometric center of the layer 338, the outer circumference of the of the layer 338 is spaced from the outer circumference of the inner cladding along two different sections of the diameter 340, as indicated by reference numerals 345A and 345B. The term asymmetric, as used herein, means that the lengths of the sections 345A and 345B are different. Preferably, one of the sections is 65% or less of the other section, mid more preferably, one of the sections is Less than 50% of the other section Alternatively or additionally, the outer cladding layer 336, which can be a hard layer as defined above, may be asymmetrically disposed relative to the inner cladding. The outer layer 338 can be omitted.

Figure 9A:
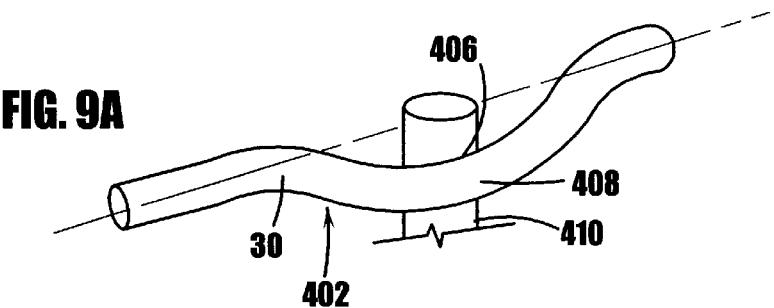
FIG. 9A shows a perspective view of an optical fiber including a bend along the longitudinal direction applying stress to the fiber.
Figure 9B:
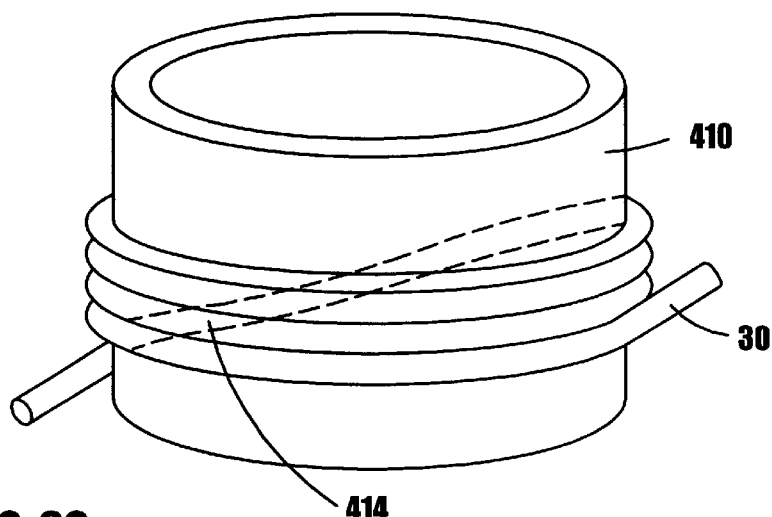
FIG. 9B illustrates winding an optical fiber about a mechanical structure for applying stress to the fiber.
Figure 9C:
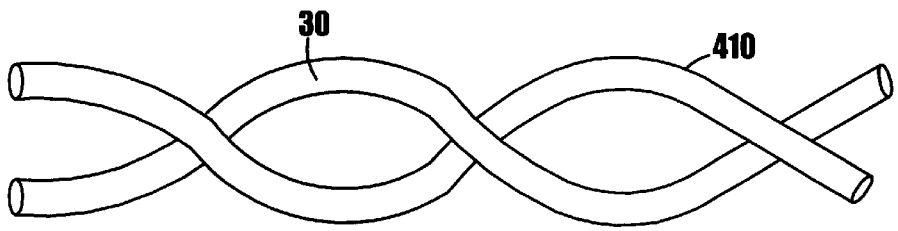
FIG. 9C illustrates another example of winding the optical fiber about a mechanical structure for applying stress to the optical fiber.

According to the invention, an external structural element or elements can be included for increasing the stress applied to a cladding-pumped optical fiber. Bending the optical fiber can apply both tensile and compressive stress to the fiber. For example, the bend 402 shown in FIG. 9A will cause compression in region 406 of the fiber 30 and tension in region 408 of the optical fiber 30. The mechanical structure 410, which in the embodiment shown in FIG. 9A is a post, can facilitate bending the optical fiber 30. The optical fiber 30 can be include multiple bends such as by being wound about two or more such posts to form a loop of fiber. The optical fiber 30 can also be continuously bent by being wound about a mechanical structure 410, which in FIG. 9B is large post or spool. The mechanical structure 410 need not be circular as shown in FIG. 9B, but can assume a variety of shapes, such as, for example, a kidney shape. The fiber 30 can be cross wound, as indicated by reference numeral 414 to further enhance mode mixing, or ray scattering, in the pump cladding of the optical fiber 30. In another variation, the mechanical structure 410 can include another fiber with which the optical fiber 30 is wound, as illustrated in FIG. 9C, for bending the cladding-pumped optical fiber 30.

Figure 9D:
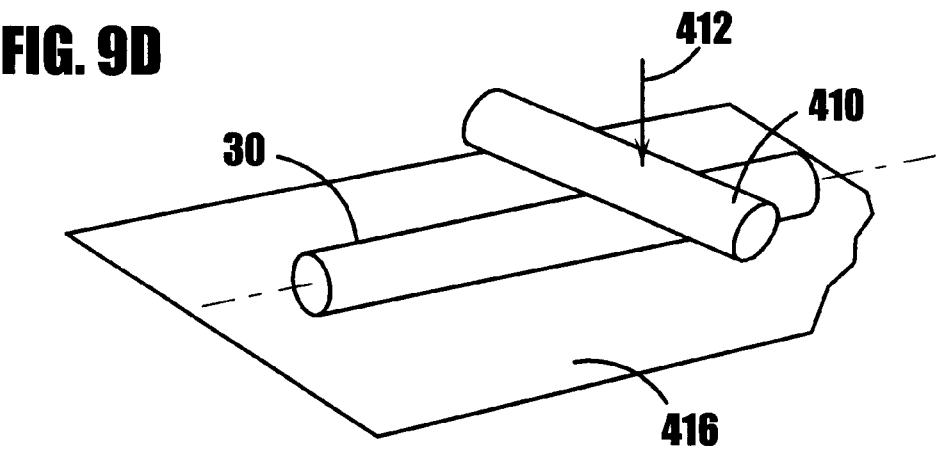
FIG. 9D illustrates applying a radial stress to the optical fiber.
Figure 9E:
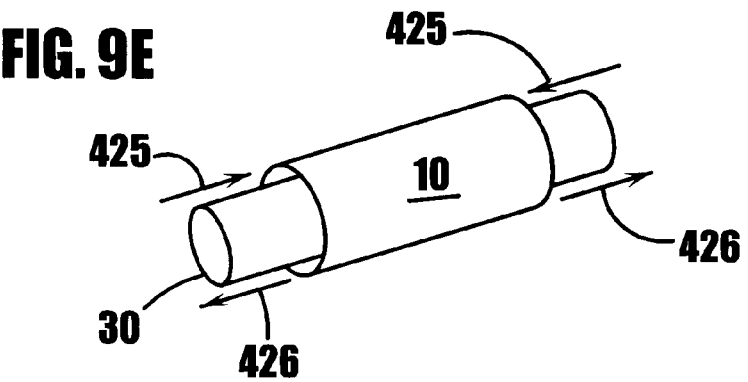
FIG. 9E illustrates applying a longitudinal stress to the optical fiber.

Stress can also be applied without substantially bending the optical fiber. As shown in FIG. 9D, a mechanical element 410, responsive to the applied force 412, can press the optical fiber 30 against the support surface 416. Also, as shown in FIG. 9E, the mechanical element 410 can include a ferrule or capillary tube that grips the fiber 30 and to which compressive forces 425 or tensile forces 426 are applied. One of ordinary skill in the art, apprised of the disclosure herein, will recognize that techniques for stressing a fiber used in conjunction with tunable fiber Bragg gratings and the like are also applicable in the context of the present invention, and, accordingly, are considered to be within the scope of the present invention.

Although the above discussion regarding FIGS. 7 and 9A–9E has referred to the optical fiber 30 shown in FIGS. 3 and 4, one or ordinary skill in the art, apprised of the disclosure herein, understands that the above discussion is also applicable to other embodiments of the invention, such as to the optical Fibers 130, 230 and 330 shown in FIGS. 5, 5A and 5B, respectively.

Thus, according to the invention, there can be provided an improved cladding-pumped optical fiber. Prior art cladding-pumped fibers can be difficult to splice to standard, circular geometry fibers. A fiber according to the invention can include an inner cladding having a circular outer circumference and hence be more readily spliced to a standard fiber. As discussed in the Background section above, prior art fibers are typically drawn at temperatures substantially lower than those used when drawing standard round fiber. These reduced temperatures can be required to preserve the desired shape of the outer circumference of the cladding layer of the resultant drawn fiber. In practicing the present invention, a higher draw temperature can be used, if desired, as the outer circumference can be substantially circular, which shape is naturally assumed given viscous nature and surface tension of the molten glass when drawn. The use of a higher draw temperature can also aid in achieving better fiber strength and lower attenuation.

It will thus be seen that the invention efficiently achieves the objects set forth above, as well as those apparent from the foregoing disclosure. It is intended that all matter included in the above disclosure be interpreted as illustrative and not in a limiting sense, as one of ordinary skill in the art, apprised of the disclosure herein, can make certain changes in the above constructions without departing from the scope of the invention.

Accordingly, it is understood that the following claims are intended to cover generic and specific features of the invention described herein, and all statements of the scope of the invention, which as a matter of language might be said to fall therebetween.

Having described the invention, what is claimed as new and to be secured by Letters Patent is:

1. Optical apparatus, comprising:
    a cladding-pumped optical fiber, said fiber including
        a core including material having a first index of refraction and including an active material;
        a multimode inner cladding layer for receiving pump radiation, said inner cladding layer disposed about said core and including material having a second index of refraction that is less than said first index of refraction;
        a second cladding layer disposed about said inner cladding layer, said second cladding layer including material having a third index of refraction that is less than said second index of refraction; and
        wherein at least one of said second cladding layer or an additional layer that is disposed about said inner cladding layer includes granular matter for applying stress to the fiber for enhancing the absorption of pump radiation by said core.

2. The optical apparatus of claim 1 wherein said cladding-pumped optical fiber includes a third layer disposed about said second cladding layer, said third layer including said granular matter.

3. The optical apparatus of claim 2 wherein said third layer is a polymer protective layer.

4. The optical apparatus of claim 1 wherein said second cladding layer includes said granular matter.

5. The optical apparatus of claim 1 wherein said granular matter includes particles having a minimum diameter of 2 microns to 100 microns.

6. The optical apparatus of claim 1 wherein said cladding-pumped optical fiber includes a compressive layer.

7. The optical apparatus of claim 1 wherein said cladding-pumped optical fiber includes a layer disposed asymmetrically about said inner cladding layer.

8. The optical apparatus of claim 1 including external means for applying stress to cladding-pumped optical fiber.

9. The optical apparatus of claim 8 wherein said external means includes a second fiber wound with said optical fiber.

10. The optical apparatus of claim 8 wherein said external means includes a mechanical structure about which said cladding-pumped optical fiber is bent.

11. The optical apparatus of claim 1 wherein said cladding-pumped optical fiber includes at least one bend.

12. Optical apparatus, comprising:
    a cladding-pumped optical fiber, said fiber including
        a core including material having a first index of refraction and including an active material;
        a multimode inner cladding layer for receiving pump radiation, said inner cladding layer disposed about said core and including material having a second index of refraction that is less than said first index of refraction;
        a second cladding layer disposed about said inner cladding layer, said second cladding layer including material having a third index of refraction that is less than said second index of refraction; and
        wherein at least one of said second cladding layer or an additional layer is disposed asymmetrically about said inner cladding layer for applying stress to said fiber for enhancing the absorption of pump radiation by said core.

13. The optical apparatus of claim 12 wherein said second cladding layer is disposed asymmetrically about said inner cladding.

14. The optical apparatus of claim 12 wherein said asymmetrically disposed layer includes a hard polymer.

15. The optical apparatus of claim 12 including external means for applying stress to cladding-pumped optical fiber.

16. The optical apparatus of claim 15 wherein said external means includes a second fiber wound with said optical fiber.

17. The optical apparatus of claim 15 wherein said external means includes a mechanical structure about which said cladding-pumped optical fiber is bent.

18. The optical apparatus of claim 12 wherein said cladding-pumped optical fiber includes at least one bend.

19. Optical apparatus, comprising:
    a cladding-pumped optical fiber, said fiber including
        a core including material having a first index of refraction and including an active material;
        a multimode inner cladding layer for receiving pump radiation, said inner cladding layer disposed about said core and including material having a second index of refraction that is less than said first index of refraction;
        a second cladding layer disposed about said inner cladding layer, said second cladding layer including material having a third index of refraction that is less than said second index of refraction; and
        wherein said cladding-pumped optical fiber includes a compressive layer that contracts after being applied to said fiber and that is disposed about said inner cladding layer for applying stress to said fiber.

20. The optical apparatus of claim 19 wherein said compressive layer is asymmetrically disposed about said inner cladding.

21. The optical apparatus of claim 19 including external means for applying stress to cladding-pumped optical fiber.

22. The optical apparatus of claim 21 wherein said external means includes a second fiber wound with said optical fiber.

23. The optical apparatus of claim 21 wherein said external means includes a mechanical structure about which the cladding-pumped optical fiber is bent.

24. The optical apparatus of claim 19 wherein said cladding-pumped optical fiber includes at least one bend.

25. Optical apparatus, comprising:
    a cladding-pumped optical fiber, said fiber including
        a core including material having a first index of refraction and including an active material;
        a multimode inner cladding layer for receiving pump radiation, said inner cladding layer disposed about said core and including material having a second index of refraction that is less than said first index of refraction;
        a second cladding layer disposed about said inner cladding layer, said second cladding layer including material having a third index of refraction that is less than said second index of refraction;
        a hard polymer layer disposed about and immediately adjacent one of said cladding layers, and wherein said optical apparatus further includes
        external means for applying stress to the cladding-pumped optical fiber.

* * * * *

UNITED STATES PATENT AND TRADEMARK OFFICE
CERTIFICATE OF CORRECTION

PATENT NO.      : 6,625,363 B2
DATED           : September 23, 2003
INVENTOR(S)     : Carter et al.

It is certified that error appears in the above-identified patent and that said Letters Patent is hereby corrected as shown below:

Column 4,
Line 12, please replace "an" with -- a --.

Column 5,
Line 7, please replace "or" with -- of --;
Line 31, please replace "or" with -- of --.

Column 6,
Line 13, please replace "to layer" with -- to a layer --;
Line 28, please replace "198" with -- 196 --;
Line 32, please replace "3A" with -- 7 --.

Column 7,
Line 28, please replace "5A" with -- 8A --;
Line 29, please replace "320" with -- 230 --;
Line 52, please replace "5B" with -- 8B --;
Line 57, please cancel "of the" where it appears for a second time;
Line 63, please replace "mid" with -- and --;
Line 64, please replace title case "Less" with lower case -- less --.

Column 8,
Line 12, please replace "can be include" with -- can include --;
Line 40, please replace "or" with -- of --;
Line 44, please replace "5A and 5B" with -- 8A and 8B --;
Line 59, please replace "given viscous" with -- given the viscous --.

Signed and Sealed this

Twenty-fifth Day of May, 2004

JON W. DUDAS
*Acting Director of the United States Patent and Trademark Office*